United States Patent [19]
Alioshin et al.

[11] Patent Number: 5,986,634
[45] Date of Patent: Nov. 16, 1999

[54] DISPLAY/MONITOR WITH ORIENTATION DEPENDENT ROTATABLE IMAGE

[75] Inventors: Paul A. Alioshin, San Francisco; Dave B. Corbin, Los Altos Hills, both of Calif.

[73] Assignee: Silicon Light Machines, Sunnyvale, Calif.

[21] Appl. No.: 08/763,523

[22] Filed: Dec. 11, 1996

[51] Int. Cl.$^6$ ...................................................... G09G 5/34
[52] U.S. Cl. ........................... 345/126; 361/681; 353/122
[58] Field of Search ...................................... 345/126, 169, 345/108, 157, 901, 905, 8; 382/296–297; 353/122; 400/472; 361/681, 695, 785

[56] References Cited

U.S. PATENT DOCUMENTS

| | | | |
|---|---|---|---|
| 4,443,819 | 4/1984 | Funada et al. | 358/236 |
| 4,561,044 | 12/1985 | Ogura et al. | 362/84 |
| 4,646,158 | 2/1987 | Ohno et al. | 358/236 |
| 4,652,932 | 3/1987 | Miyajima et al. | 358/236 |
| 4,663,670 | 5/1987 | Ito et al. | 358/245 |
| 4,803,560 | 2/1989 | Matsunaga et al. | 358/236 |
| 4,809,078 | 2/1989 | Yabe et al. | 358/236 |
| 4,814,759 | 3/1989 | Gombrich et al. | 340/771 |
| 4,952,925 | 8/1990 | Haastert | 340/784 |
| 5,119,204 | 6/1992 | Hashimoto et al. | 358/254 |
| 5,179,367 | 1/1993 | Shimizu | 340/700 |
| 5,189,404 | 2/1993 | Masimo et al. | 345/115 |
| 5,311,360 | 5/1994 | Bloom et al. | |
| 5,329,289 | 7/1994 | Sakamoto et al. | 345/126 |
| 5,359,349 | 10/1994 | Jambor et al. | 345/168 |
| 5,467,106 | 11/1995 | Salomon | 345/87 |
| 5,640,216 | 6/1997 | Hasegawa et al. | 349/58 |
| 5,707,160 | 1/1998 | Bowen | 400/472 |
| 5,713,652 | 2/1998 | Zavracky et al. | 353/122 |
| 5,757,354 | 5/1998 | Kawamura | 345/126 |
| 5,815,126 | 9/1998 | Fan et al. | 345/8 |

FOREIGN PATENT DOCUMENTS 0 458 316 A2  11/1991  European Pat. Off. .

OTHER PUBLICATIONS

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Primary Examiner—Richard A. Hjerpe
Assistant Examiner—Francis Nguyen
Attorney, Agent, or Firm—Haverstock & Owens LLP

[57] ABSTRACT

A display with orientation dependent rotatably image presents a properly oriented image in a first mounted fold-down position and a second up-right table-top position. The display folds up into a base unit when not being used for compact storage of the system. An orientation determining device is included for determining the current orientation of the display and properly orienting the image based on that current orientation. The orientation determining device is either a mechanically flipped switch, an automatic switch or an acceleration sensor. The display screen is preferably an LCD screen. Alternatively, the display screen is a light valve type display including a grating light valve system. The display is for use in a television system, computer system, video phone or browser. Infrared input devices are used to control the display and provide data to the computer system. In an alternate embodiment, a touch sensitive screen is also used as an input device.

48 Claims, 4 Drawing Sheets

DISPLAY/MONITOR WITH ORIENTATION DEPENDENT ROTATABLE IMAGE

FIELD OF THE INVENTION

The present invention relates to the field of monitors and displays for use in televisions, computers, browsers and the like. More particularly, the present invention relates to the field of compact monitors and displays which are designed to fold into a base unit for storage and transfer.

BACKGROUND OF THE INVENTION

Displays and monitors presently come in many shapes and sizes and are adapted for use in multiple environments, including compact and portable televisions, computers and games. Together, televisions, displays and monitors will herein be referred to as a group as displays. Displays are typically used to playback television and video signals from an antenna, cable, video camera and video cassette recorder (VCR). Displays are further used to display computer generated information such as text and graphics. When configured and controlled properly, conventional displays are able to display both computer text and graphics as well as television and other video signals. When audio is included within the received signal, an appropriately configured display will also have the capability to playback an audio signal as well.

Displays have been designed to be compact and fit into small places in the home, in vehicles, in portable computers and video cameras. Such compact displays typically include a liquid crystal display (LCD) screen on which the video image is presented.

A retractable face-up LCD monitor is taught in U.S. Pat. No. 5,467,106 by Salomon. When in the closed position, the monitor is stored screen up within a restricted space housing. A motor within the housing is used to pivot the monitor between its open and retracted positions. The electronics necessary to receive video signals and control the LCD display move with the monitor when it is in the open position. This monitor was designed for use in aircraft and will operate in only a single orientation.

A flat panel display monitor is taught in U.S. Pat. No. 4,814,759 by Gombrich et al. A housing, secured to a wall, includes a support assembly for supporting the display in multiple positions. The support assembly includes arms which are rotatably interconnected to the display screen so that when secured within the housing, the display screen is positioned inside the housing and when positioned out for viewing, the display screen is rotated to face outward.

A video display unit workstation is taught by Jamber et al. in U.S. Pat. No. 5,359,349. This video display unit workstation is stored away in the back rest of a vehicle seat. The video display unit includes a keyboard and is designed to allow a passenger in a vehicle to work on a computer through the video display unit while riding in the vehicle. When not in use, the video display unit folds into the back rest of the seat in front of the passenger. When in use, the video display unit taught by Jamber et al. works in only a single orientation.

What is needed is a compact and portable display having multiple uses which can be adapted for many different environments. What is further needed is a compact and portable display which will operate in multiple orientations.

SUMMARY OF THE INVENTION

A display with orientation dependent rotatable image presents a properly oriented image in a first mounted fold-down position, a second up-right table-top position and a third portrait mode position. The display folds up into a base unit when not being used for compact storage of the system. An orientation determining device is included for determining the current orientation of the display and properly orienting the image based on that current orientation. The orientation determining device is either a mechanically flipped switch, an automatic switch or an acceleration sensor. Other orientation sensors can be used such as a mercury switch. The display screen is preferably a diffraction grating light valve (GLV) projection system. Alternatively, the display screen is an LCD screen, an LCD projection system, a reflective LCD system, a DMD projection system, a field emission projection system, or an electroluminscent projection system. The display is for use in a television system, computer system, video phone or internet browser. Preferably, wireless input devices are used to control the display and provide data to the computer system. In an alternate embodiment, a touch sensitive screen is also used as an input device.

DETAILED DESCRIPTION OF THE PREFERRED EMBODIMENT

Figure 1A:
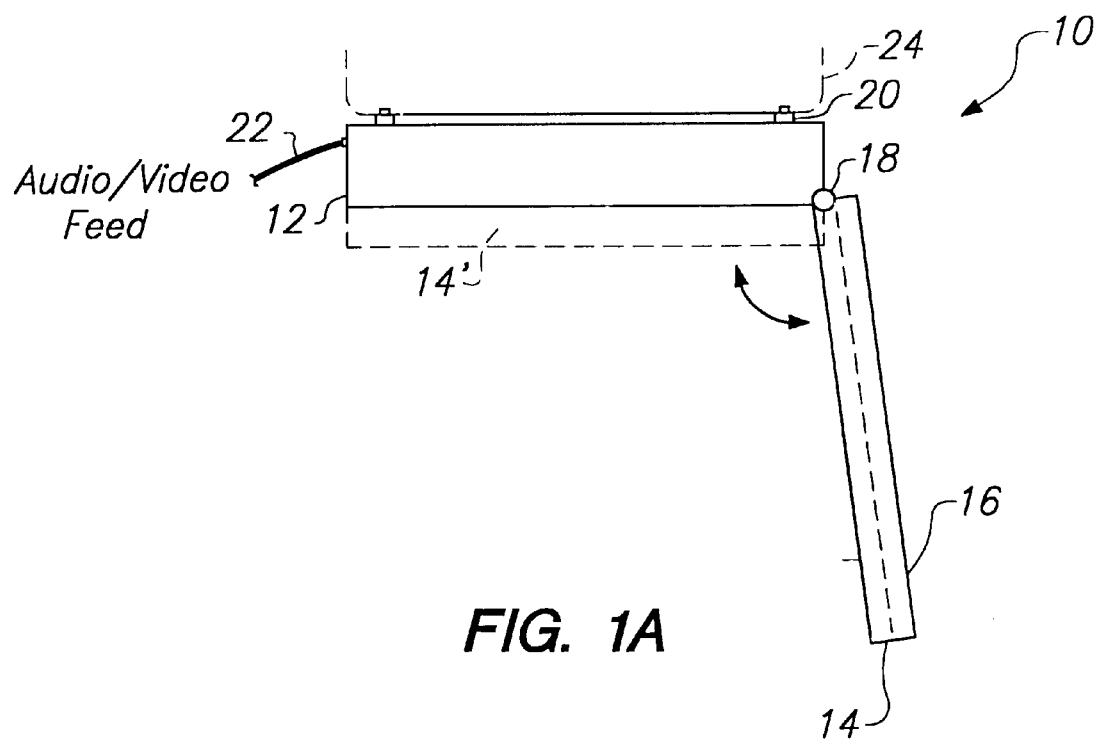
FIG. 1A illustrates a side view of the display of the present invention mounted underneath a cabinet in a fold-down orientation.

A display of the present invention is designed to both fit under a cabinet and to sit on a table top. In either a fold-down orientation or an upright orientation, the image displayed by the display screen will be correctly presented for proper viewing. The display is designed for use in either a television, digital display or with a computer system. The display can be configured with wireless input devices to control the display and provide data to the computer system. These input devices include a remote control, a keyboard and/or a mouse. In one embodiment, a touch sensitive screen is also used as an input device.

The display includes a base unit which supports the display. The base unit includes the electronic components and optics necessary to control the operation of the display. In the computer embodiment, the base unit also includes the electronic components required for operation of the computer. It is clear that the screen is upside down or sideways in these various orientations relative to one another. Nevertheless, the base unit can be mounted underneath a cabinet or other surface or can sit on top of a surface. In any of the orientations, the display unit will present the video image properly for viewing from the display screen.

For mounting under a cabinet, either the display can be screw mounted or preferably a releasable bracket can be used. By way of example, the unit can be mounted under a kitchen cabinet to display a television show or present data, such as a recipe, while the user is cooking. The unit can then be easily released from the bracket and used as desk top display.

The orientation of the image shown on the display screen will change as the orientation of the display changes, in order to provide a proper presentation of the image for viewing. The orientation of the image is controlled by one or more switches which are toggled by a user when the orientation of the display is changed. In an alternate embodiment, an acceleration sensor is included within the base unit for automatically determining the orientation of the display. Other orientation sensors can also be used such as a mercury switch. The presentation of the image on the display will be configured according to the orientation of the display as provided from the acceleration sensor. In a further alternate embodiment, the base unit is slidably mounted in a bracket and mechanical interlock system when the display is positioned underneath a cabinet, in the fold-down orientation. When the base unit is secured within this mechanical interlock system, a switch is automatically toggled so that the orientation of the image presented by the display is proper.

The display of the preferred embodiment of the present invention includes an array of GLV pixels to present images representing computer text and graphics, television signal or video feed. In an alternative embodiment of the present invention, an LCD screen, an LCD projection system, a reflective LCD system, a DMD projection system, a field emission projection system, or an electroluminscent projection system is utilized within the display to project images representing the computer text and graphics, television signal or video feed. The light valve system display includes an accordion style enclosure extending from the base unit to the display screen. In the alternative, the enclosure could be a stretchable fabric or an interlocking telescoping light shield. Other expandable enclosures can be used. The light valve system includes an optics system and uses either a shutter, color wheel, sequential color light sources or three light valves, one each for red, green and blue, to obtain the proper image and the proper coloring for the image when projecting the image from a grating light valve onto the display screen.

A display of the present invention mounted under a cabinet and in a fold-down configuration is illustrated in FIG. 1A. For simplicity of explanation, an LCD panel will be described first. The display 10 includes a base unit 12 which supports an LCD panel 14, shown in an open configuration, folded down from the base unit 12. The LCD panel 14 will also fold back onto the base unit 12, in a closed position, as shown by the dotted lines and the reference numeral 14'. The LCD panel 14 is rotatably coupled to the base unit 12 by a hinge 18. The hinge 18 allows the LCD panel 14 to pivot between the open position and the closed position. The LCD panel 14 rotates through approximately a right angle as illustrated by the arrows in FIGS. 1A and 1B. In FIG. 1A, the video image is presented for viewing from the screen 16 on the front of the LCD panel 14. It should be noted that the screen 16 is located on the exterior of the display 10 when the display 10 is in the closed position.

The base unit 12 is secured underneath a cabinet 24 or other support surface through the feet 20. The feet 20 can be configured to accept screws, bolts, or other fasteners from within the cabinet 24. An audio/video feed cable 22 is coupled to the base unit 12 to provide a video signal for display on the LCD panel 14. As will be discussed below, the electronic circuitry necessary for receiving the video signal and controlling the LCD panel 14 is included within the base unit 12.

Figure 1B:
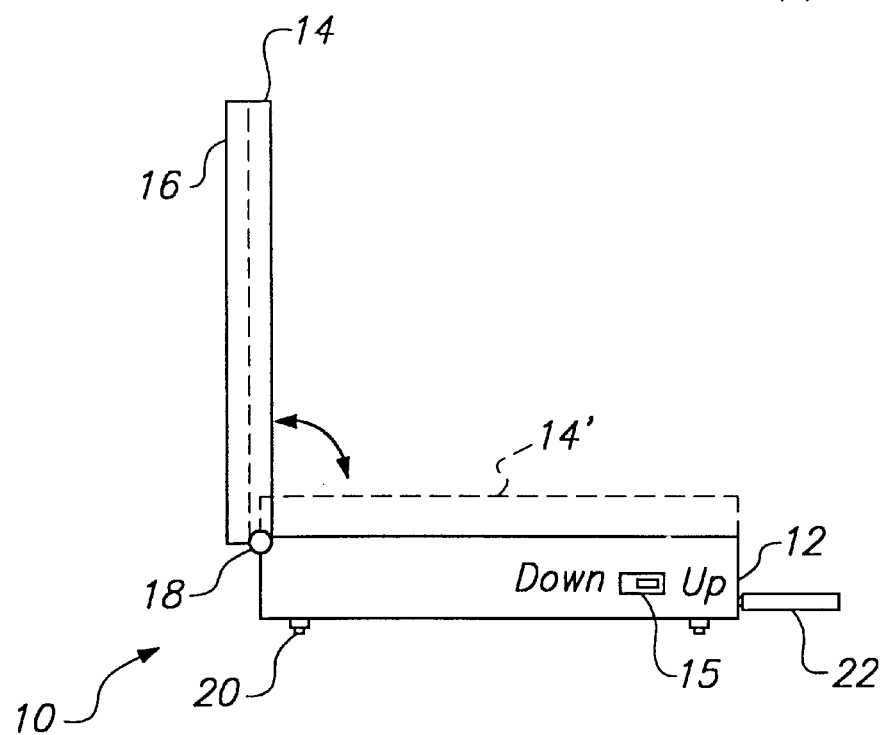
FIG. 1B illustrates a side view of the display of the present invention in an upright orientation.

The display 10 of the present invention is designed to also sit on a counter or table top in an upright position, as illustrated in FIG. 1B. In this orientation, the base unit 12 rests on the feet 20. The base unit 12 includes a switch 15 which is toggled between the mounted fold-down orientation and the up-right table-top orientation by a user. Based on the state of the switch 15, the image is presented properly for viewing on the screen 16 of the LCD 14. When in the mounted fold-down orientation, the top of the image must be presented on the portion of the screen 16 closest to the hinge 18. When in the upright table-top position, the top of the image must be presented on the portion of the screen 16 farthest from the hinge 18. Accordingly, the display 10 of the present invention, will present the image properly with the LCD panel 14 in either the mounted fold-down orientation or the up-right table-top orientation. The display can also be presented in so-called portrait mode. In this orientation, the display panel rests on its side relative to the orientations shown in FIGS. 1A and 1B. Portrait mode will be described in more detail below relative to FIG. 7.

In an alternate embodiment, the display 10 includes an acceleration sensor for automatically determining the orientation of the LCD panel 14 for proper presentation of the image on the screen 16 of the LCD panel 14. The acceleration sensor determines the orientation of the base unit 12 using the pull of the earth's gravity. The acceleration sensor then provides a signal to a video controller and the proper image is communicated to the LCD panel 14, based on the orientation of the base unit 12. Other orientation sensors can also be used such as a mercury switch to determine whether the display is in table top or fold-down orientation.

Figure 7:
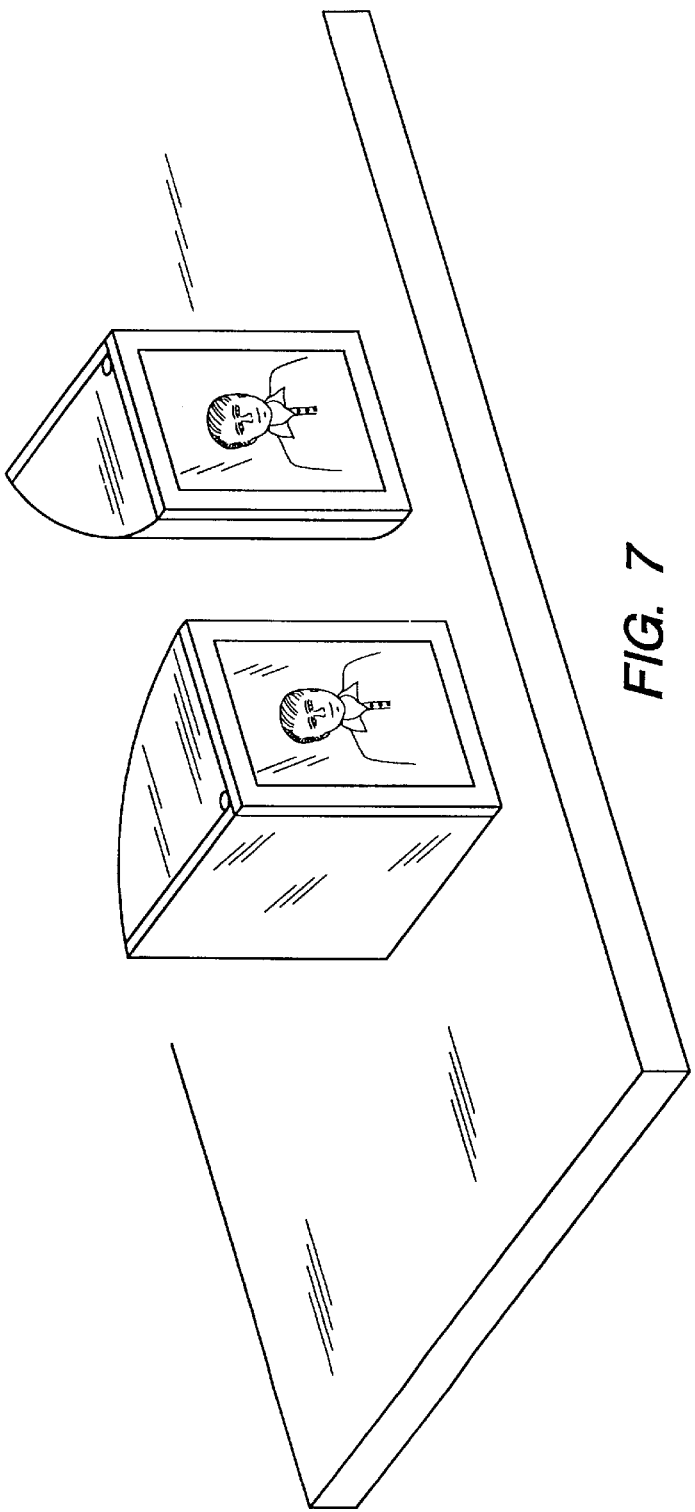
FIG. 7 illustrates a perspective view of two preferred displays in a left side and right side portrait mode.

It should be noted that the display apparatus can also be opened on its side using the walls of the base and display as a support platform. In this orientation, the display can be automatically configured to present a image in so-called portrait format as shown in FIG. 7. An additional acceleration sensor or mercury switch can be utilized to sense when portrait format is required. Indeed, these sensors can determine whether a left side portrait display or a right side portrait display is required.

In a further alternate embodiment, a mounting bracket is secured to the cabinet 24. The base unit 12 is then slidably mounted into this mounting bracket when the display is positioned under the cabinet, in the mounted fold-down position. An automatic switch is triggered when the base unit 12 is slid into the mounting bracket so that when the LCD panel 14 is opened up and folds away from the base unit 12, the image presented on the screen 16 will have the correct orientation for viewing. When the base unit 12 is not in the mounting bracket, the automatic switch is not triggered, so that when the LCD panel 14 is opened up or folded away from the base unit 12, the image presented will be in the correct orientation for viewing in the up-right position.

Figure 2:
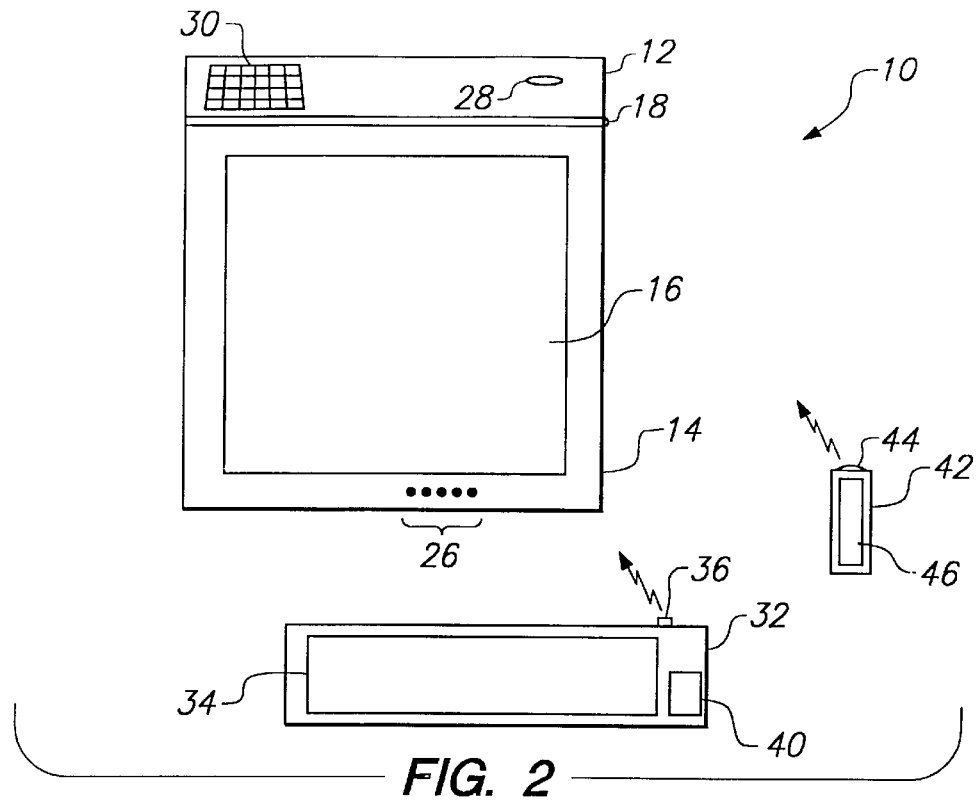
FIG. 2 illustrates a front view of the display of the present invention in the fold-down orientation with infrared input devices.

A front view of the display 10 of the present invention, with the LCD panel 14 in the open position, folded down away from the base unit 12, is illustrated in FIG. 2. A speaker 30 is included within the base unit 12 to provide audio output from the display unit 10. It should be apparent to those skilled in the art that two speakers could be included within the base unit 12 in order to provide an audio output in stereo. Control knobs or buttons 26 are included on the front of the display 10 for controlling operation of the LCD panel 14. A wireless input receiver 28 is also included on the front of the base unit 12 for receiving input and controlling information from a wireless remote control device 42 and a wireless keyboard which can include an integral mouse unit 32. The wireless technology can include either radio frequency (RF) or infrared (IR) transmissions. The wireless remote control device 42 includes a keypad from which a user can enter channel number, volume or other input information for controlling operation of the display unit 10. The wireless remote control device 42 also includes a wireless transmitter 44 which transmits the data input by the user to the display unit 10 through the wireless input receiver 28.

The wireless remote keyboard and integral mouse unit 32 includes a keyboard 34 and can include an integral mouse 40 or other cursor control device. The integral mouse 40 is used for cursor positioning and is preferably a conventional touch pad type device. Alternatively, the mouse 40 can be a conventional rollerball type device or any other appropriate cursor positioning device. As will be apparent to those skilled in the art, a separate wireless keyboard and wireless mouse unit can be used instead of the integral unit 32 included within the preferred embodiment. The wireless remote keyboard and integral mouse unit 32 also includes an wireless transmitter 36 which transmits the data input on the keyboard 34 and mouse unit 40 to the display unit 10 through the wireless input receiver 28. The wireless remote keyboard and integral mouse unit 32 is used with a computer or browser embodiment, which will be discussed in detail below, to enter data through the wireless input receiver 28.

Figure 3:
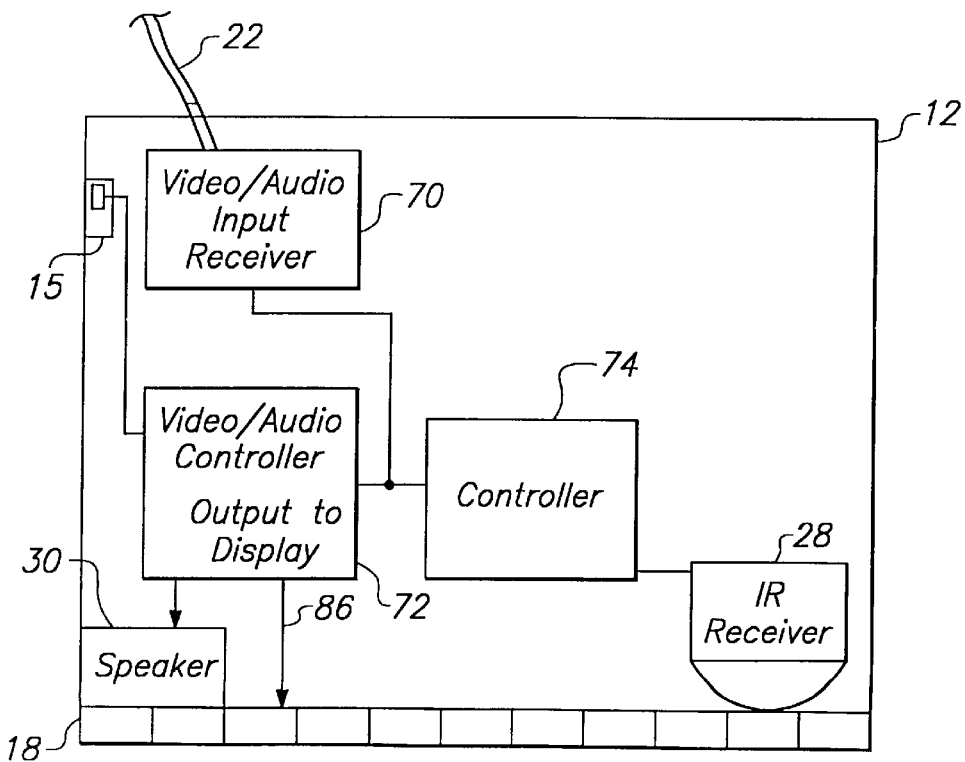
FIG. 3 illustrates a schematic block diagram of the display of the present invention.

A schematic block diagram of the control circuits included within the display 10 of the present invention is illustrated in FIG. 3. The control circuits are included within the base unit 12 of the display 10. An audio/video feed or input signal 22 is coupled to a video/audio input receiver circuit 70. The input signal 22 can be from an antenna, television cable, video cassette recorder (VCR) or a video camera. The video/audio input receiver circuit 70 is coupled to a video/audio controller circuit 72 and to a main controller circuit 74. The video/audio controller 72 is coupled to the switch 15 for determining the proper orientation of the image to be presented for viewing. The controller 74 is coupled to the video/audio controller circuit 72 and to an wireless receiver circuit 28. The wireless receiver circuit 28 receives the wireless transmissions from the wireless remote control device 42 and the wireless keyboard and integral mouse unit 32. The data from the wireless transmissions received by the wireless receiver circuit 28 is provided to the controller circuit 74 for controlling the operation of the LCD 14. The video/audio controller circuit 72 is coupled to the speaker 30 for providing the audio output from the display unit 10. The video/audio controller circuit 72 is also coupled to the LCD 14 through the signal line 86 for providing the video output.

Figure 4:
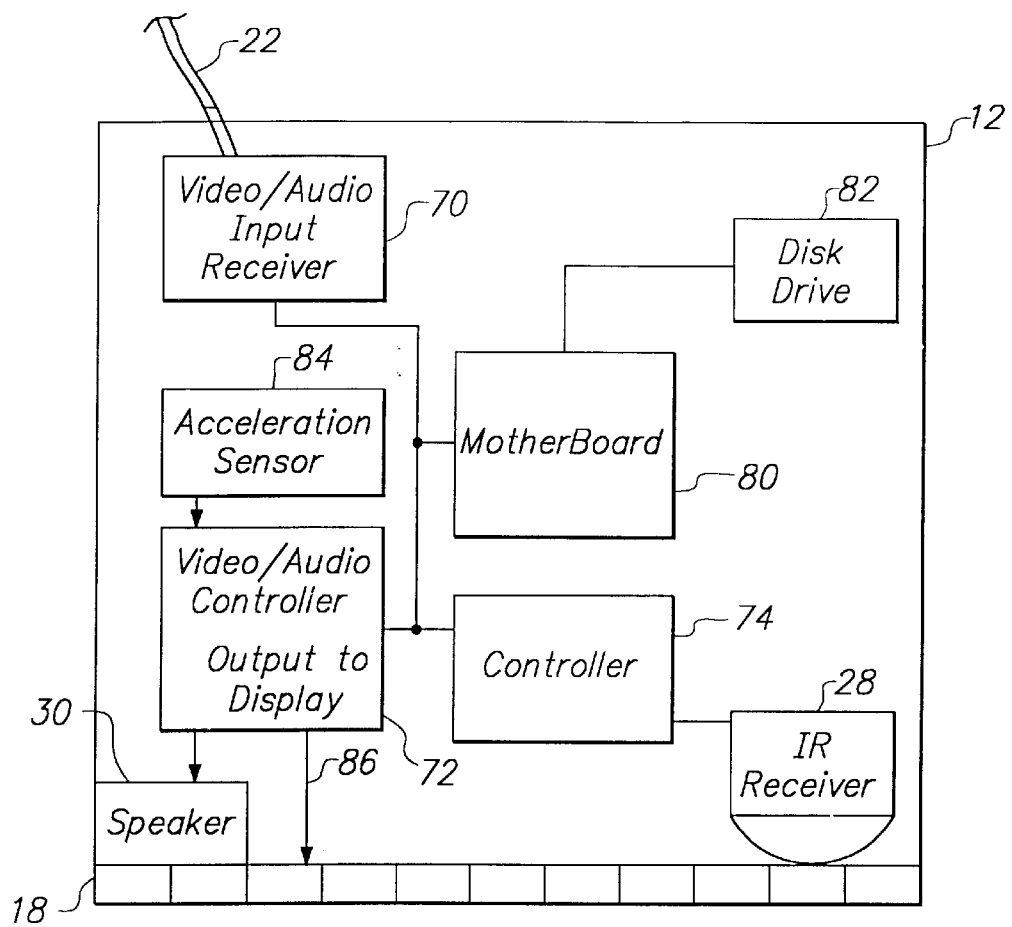
FIG. 4 illustrates a schematic block diagram of an alternate computer embodiment of the display of the present invention.

A schematic block diagram of the control circuits included within an alternate embodiment of the display 10 is illustrated in FIG. 4. The embodiment illustrated in FIG. 4 includes the circuits necessary for operation of the display as a computer or internet browser. A motherboard 80 is configured to include conventional digital circuitry as commonly found in a computer system such as a processor, memory, input/output circuitry and the like. However, such circuitry is ancillary to the elements of the display subsystem of the present invention and will not be discussed in detail herein. The control circuits are included within the base unit 12 of the display. The video/audio input receiver circuit 70 is coupled to receive the audio/video feed or input signal 22. The video/audio input receiver circuit 70 is also coupled to the video/audio controller circuit 72, to the controller circuit 74 and to a motherboard 80. The video/audio controller circuit 72 is coupled to an acceleration sensor 84 for automatically determining the orientation of the LCD 14 for presenting the image in a proper orientation for viewing. The video/audio controller 72 is also coupled to the controller circuit 74 and to the motherboard 80. The controller circuit 74 is coupled to the motherboard 80 and to the wireless receiver circuit 28. The wireless receiver circuit 28 receives the wireless transmissions from the wireless remote control device 42 and the wireless keyboard and integral mouse unit 32. The data from the wireless transmissions received by the wireless receiver circuit 28 is provided to the controller circuit 74 for controlling the operation of the display unit and for providing input data to the motherboard 80. The motherboard 80 is also coupled to a disk drive 82 through which data is input to and output from the motherboard 80 for use by the computer system. The video/audio controller circuit 72 is coupled to the speaker 30 for providing the audio output. The video/audio controller circuit 72 is also coupled to the LCD 14 through the signal line 86 for providing the video output.

Figure 6:
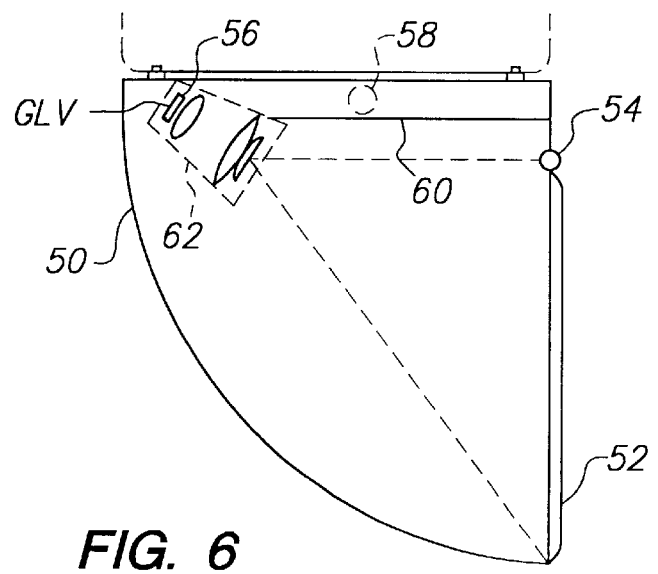
FIG. 6 illustrates a side view of the preferred embodiment including the light valve system display, in an open position.
Figure 5:
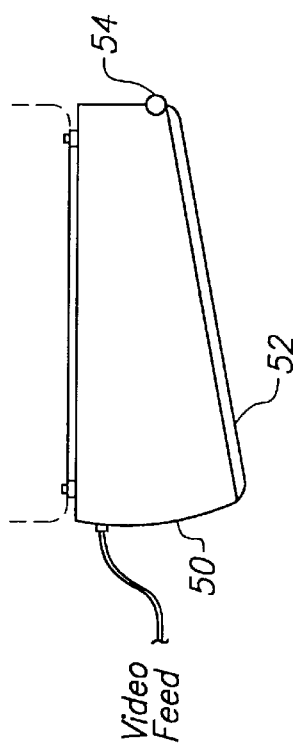
FIG. 5 illustrates a side view of the preferred embodiment of the display of the present invention including a light valve system display, in a closed position.

A side view of the preferred embodiment of the present invention is illustrated in FIGS. 5 and 6. In this preferred embodiment, a light valve system display is used to replace the LCD, discussed above. A side view of the light valve system display in the closed position is illustrated in FIG. 5. A side view of the light valve system display in the open position is illustrated in FIG. 6. In this embodiment, the display includes a fan-fold accordion style enclosure 50 which expands out with the actual display screen 52 when the display is in the open position. The accordion style enclosure 50 provides a full enclosure around the back of the display screen 52 and the interior components of the display system, including the components illustrated in either FIG. 3 or FIG. 4. When the display is closed, the accordion style enclosure 50 is folded up into the base, as illustrated in FIG. 5. In the closed position, the display screen 52 is located on the exterior surface of the display and faces out. In the alternative, the enclosure could be a stretchable fabric or an interlocking telescoping light shield. Other expandable enclosures can also be used. The display screen 52 pivotally rotates, around the hinge 54, between the open and the closed positions. In addition, the angle of the display screen can be adjusted through approximately 90 degrees, as shown in FIGS. 5 and 6. This embodiment of the display will also operate in either a mounted fold-down orientation or an up-right table-top orientation, as described above.

A light valve system 62 is included within the accordion style enclosure 50. A grating light valve 56 is included within the light valve system 62 as well as an appropriate combination of optics components, including at least one lens and at least one shutter. Preferably, the light valve is a diffraction grating light valve. A lamp or light source 58 is used to illuminate the grating light valve to create the appropriate image which is optically manipulated within the optics components 64 of the light valve system and ultimately projected to be displayed on the display screen 52. A light break or light impervious wall 60 is included within the interior of the display unit, positioned between the lamp 58 and the screen 52 in order to prevent light from the lamp 58 from interfering with the projection of the image by the light valve system 62. The configuration and operation of such a light valve system is described in U.S. patent application Ser. No. 08/473,759 filed on Jun. 7, 1995 and entitled DIFFRACTION GRATING LIGHT DOUBLING COLLECTION SYSTEM, which is hereby incorporated by reference. It will be apparent to those skilled in the art that other appropriate configurations could be used for the light valve system 62.

The display apparatus can be focussed by providing separate access to a focus ring that adjusts the position of the lenses relative to the screen for controlling the formation of an image on the screen. In other embodiments, it is possible to focus the image by adjusting the angle of the display screen relative to the base. In many cases, such an angle focussing technique can reduce the cost of manufacturing the system.

In either the LCD or the light valve display embodiment of the present invention, the display can be used in a number of different types of systems, including but not limited to a television, a video recorder, a video phone or a computer. It is envisioned that the computer implementation can be a relatively simple system for home or vehicle automation, an internet browser type system or a sophisticated portable type full-range computer system. Additionally, the present invention can conveniently be used in a display for a lab computer or test equipment display to preserve valuable bench top area by mounting the display under a conventional lab bench upper shelf and similarly in a seat back for use in an automobile or airplane. A display according to the present invention can also be used to view both video images and computer graphics and text.

The home or vehicle automation computer system can be conveniently stored in an out of the way space to be brought out or opened up only when necessary. Because of the compact design of the system of the present invention, the system can be mounted under a shelf or cabinet and only folded down when necessary. This type of system can also include a touch sensitive screen for entering data into the computer system.

The internet browser system will be coupled to a phone line or other internet access service through a modem port or wireless connection. The wireless keyboard and mouse will be used to input data into the system. This system can also be conveniently stored in an out of the way space to be brought out or opened up only when necessary. Because most of the likely uses of this type of system will be in the home, the wireless keyboard and mouse are constructed of durable plastic and sealed so that they can be washed in a dishwasher or wiped clean. This system will also include a microphone and camera in order that the system can be used as a video speaker phone.

The portable type computer system is designed to be a full-range computer system having the typical capabilities of such computer systems. This portable type computer system can be mounted in the mounting bracket, as described above, in a convenient out of the way space. The portable computer system can also be pulled away from the mounting bracket and carried with the user for use at any remote location. The image presented by the display will have the correct orientation for either location because of the inclusion of the orientation determining device.

The display of the present invention is for use in a television and/or computer system. The display can be mounted in a convenient location underneath a shelf, cabinet or other support structure or can also sit on top of a surface. The display screen can be used to present an image whether the screen in right-side-up, up-side-down or sideways. An orientation determining device is included for determining the current orientation of the system and presenting the video image properly for the current orientation. The orientation determining device can be a mechanically flipped switch, an automatic switch or an acceleration sensor which automatically uses the pull of the earth's gravity to determine the current orientation of the display. The display screen is either a LCD screen or a light valve display. Wireless input devices are used to input data for control and operation of the system.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A display for presenting video images comprising:
   a. a base unit configured for vertical rotation and for supporting the display in one of a plurality of positions, including an up-right table-top position wherein the base unit is located at a bottom of the display and a mounted, fold-down position wherein the base unit is inverted;
   b. a display screen rotatably coupled to the base unit, the display screen for displaying the video images in a proper orientation in each of the plurality of positions, wherein the display screen includes a closed position relative to the base unit and an open position relative to the base unit and wherein the display screen is exposed in the closed position;
   c. a control circuit coupled to the display screen for controlling operation of the display screen and configured for receiving a video input signal for display on the display screen; and
   d. means for determining orientation of the base unit, coupled to the control circuit and configured for determining which one of the plurality of positions is a current position of the display and communicating the current position to the control circuit in order that the control circuit will properly control the operation of the display screen to orient the video images for proper viewing in the current position.

2. The display as claimed in claim 1 wherein the plurality of positions also includes a side oriented position with the base unit oriented on its side for presenting a portrait mode image.

3. The display as claimed in claim 1 further comprising an input device for controlling operation of the display.

4. The display as claimed in claim 3 wherein the input device is configured to communicate to the display using infrared signal transmissions.

5. The display as claimed in claim 1 wherein the means for determining orientation of the base unit includes a mechanical switch lipped by a user when the position of the display is changed.

6. The display as claimed in claim 1 further comprising a mounted bracket into which the display is slidably secured when in the mounted position.

7. The display as claimed in claim 6 wherein the means for determining orientation of the base unit includes an automatic switch which is automatically triggered when the display is slidably secured within the mounting bracket, signalling that the display is currently in the mounted position.

8. The display as claimed in claim 1 wherein the means for determining orientation of the base unit includes an acceleration sensor which automatically determines the current position of the display.

9. The display as claimed in claim 1 wherein the means for determining orientation of the base unit includes a mercury switch which automatically determines the current position of the display.

10. The display as claimed in claim 1 wherein the display screen is an LCD panel.

11. A light valve display system for presenting video images comprising:
   a. a base unit configured for supporting the display system in one of a plurality of positions, including a mounted, fold-down position and an up-right table-top position;
   b. a display screen rotatably coupled to the base unit, the display screen for displaying the video images in a proper orientation in each of the plurality of positions, wherein the display screen includes a closed position relative to the base unit and an open position relative to the base unit and wherein the display screen is exposed when the display screen is in the closed position;
   c. a projection light valve system configured for receiving a light signal and modulating the light signal in response to a video input signal and projecting the video images representing the video input signal onto the display screen; and
   d. means for determining orientation of the base unit, coupled to the light valve system and configured for determining a current position of the display system and communicating the current position to the light valve system in order that the light valve system will present the video images in a proper orientation onto the display screen for the current position.

12. The light valve display system as claimed in claim 11 further comprising a fan-fold enclosure coupled to sides of the display screen for fully enclosing an area between the display screen and the base unit.

13. The light valve display system as claimed in claim 12 further comprising an input device for controlling operation of the display.

14. The light valve display system as claimed in claim 13 wherein the input device communicates to the display using infrared signal transmissions.

15. The light valve display system as claimed in claim 12 wherein the means for determining orientation of the base unit includes a mechanical switch flipped by a user when the position of the display system is changed.

16. The light valve display system as claimed in claim 12 further comprising a mounting bracket into which the display is slidably secured when in the mounted position.

17. The light valve display system as claimed in claim 16 wherein the means for determining orientation of the base unit includes an automatic switch which is automatically tripped when the display system is slidably secured within the mounting bracket, signalling that the display system is currently in the mounted position.

18. The light valve display system as claimed in claim 12 wherein the means for determining orientation of the base unit includes an acceleration sensor which automatically determines the current position of the display system.

19. A computer system comprising:
   a. a display for presenting video images including:
      i a base unit for supporting the display in one of a plurality of positions, including a mounted, fold-down position and an Lip-right table-top position;
      ii. a display screen rotatably coupled to the base unit including a closed position relative to the base unit and an open position relative to the base unit, the display screen for displaying the video images in a proper orientation in each of the plurality of positions, wherein the display screen will rotate between the closed position relative to the base unit and the open position relative to the base unit and wherein the display screen is exposed when the display screen is in the closed position;
      iii a control circuit coupled to the display screen for controlling operation of the display screen and configured for receiving an input signal representing the video images to be displayed on the display screen; and
      iv. means for determining orientation of the base unit, coupled to the control circuit and configured for determining a current position of the display and communication the current position to the control circuit in order that the control circuit will properly control the operation of the display screen to orient the video images for proper viewing in the current position; and
   b. a computer control circuit coupled to the display for receiving and processing data and providing input and control signals to the control circuit.

20. The computer system as claimed in claim 19 wherein the display screen includes a touch sensitive screen for receiving data and input from a user.

21. The computer system as claimed in claim 19 further comprising a keyboard for entering data into the computer system.

22. The computer system as claimed in claim 21 further comprising a cursor positioning device for positioning a cursor on the display screen during operation of the computer system.

23. The computer system as claimed in claim 22 wherein the keyboard and cursor positioning device communicate with the computer control circuit using infrared signal transmissions.

24. The computer system as claimed in claim 19 wherein the means for determining orientation of the base unit includes a mechanical switch flipped by a user when the position of the display is changed.

25. The computer system as claimed in claim 19 further comprising a mounting bracket into which the display is slidably secures when in the mounted position.

26. The computer system as claimed in claim 25 wherein the means for determining orientation of the base unit includes an automatic switch which is automatically tripped when the display is slidably secured within the mounting bracket, signalling that the display is currently in the mounted position.

27. The computer system as claimed in claim 19 wherein the means for determining orientation of the base unit includes an acceleration sensor which automatically determines the current position of the display.

28. The computer system as claimed in claim 19 wherein the display screen is an LCD.

29. The computer system as claimed in claim 19 wherein the control circuit of the display includes a light valve system having a grating light valve configured for receiving the input signal and projecting video images representing the input signal onto the display screen.

30. The display as claimed in claim 1 further comprising a fan-fold enclosure coupled to sides of the display screen for fully enclosing an area between the display screen and the base unit.

31. The display as claimed in claim 1 further comprising an expandable enclosure coupled to sides of the display screen for fully enclosing an area between the display screen and the base unit.

32. The light valve display system as claimed in claim 11 further comprising an expandable enclosure coupled to sides of the display screen for fully enclosing an area between the display screen and the base unit.

33. The light valve display system as claimed in claim 11 wherein the plurality of positions also includes a side oriented position with the base unit oriented on its side for presenting a portrait mode image.

34. The computer system as claimed in claim 19 further comprising a fan-fold enclosure coupled to sides of the display screen for fully enclosing an area between the display screen and the base unit.

35. The computer system as claimed in claim 19 further comprising an expandable enclosure coupled to sides of the display screen for fully enclosing an area between the display screen and the base unit.

36. The computer system as claimed in claim 19 wherein the plurality of positions also includes a side oriented position with the base unit oriented on its side for presenting a portrait mode image.

37. A display for presenting video images comprising:
   a. a base unit for supporting the display in one of a plurality of positions, including a mounted, fold-down position and an up-right table-top position;
   b. a display screen rotatably coupled to the base unit, the display screen for displaying the video images in a proper orientation in each of the plurality of positions, wherein the display screen will rotate through 90 degrees between a closed position relative to the base unit and an open position relative to the base unit;
   c. a control circuit coupled to the display screen for controlling operation of the display screen and configured for receiving a video input signal for display on the display screen; and
   d. means for determining orientation of the base unit, coupled to the control circuit for determining a current position of the display and communicating that position to the control circuit in order that the control circuit will properly control the operation of the display screen to orient the video images for proper viewing in the current position.

38. The display as claimed in claim 37 wherein the plurality of positions also includes a side oriented position with the base unit oriented on its side for presenting a portrait mode image.

39. The display as claimed in claim 37 further comprising an input device for controlling operation of the display.

40. The display as claimed in claim 39 wherein the input device communicates to the display using infrared signal transmissions.

41. The display as claimed in claim 37 wherein the means for determining orientation of the base unit includes a mechanical switch flipped by a user when the position of the display is changed.

42. The display as claimed in claim 37 further comprising a mounting bracket into which the display is slidably secured when in the mounted position.

43. The display as claimed in claim 42 wherein the means for determining orientation of the base unit includes an automatic switch which is automatically triggered when the display is slidably secured within the mounting bracket, signalling that the display is currently in the mounted position.

44. The display as claimed in claim 37 wherein the means for determining orientation of the base unit includes an acceleration sensor which automatically determines the current position of the display.

45. The display as claimed in claim 37 wherein the means for determining orientation of the base unit includes a mercury switch which automatically determines the current position of the display.

46. The display as claimed in claim 37 wherein the display screen is an LCD panel.

47. The display as claimed in claim 37 further comprising a fan-fold enclosure coupled to sides of the display screen for fully enclosing an area between the display screen and the base unit.

48. The display as claimed in claim 37 further comprising an expandable enclosure coupled to sides of the display screen for fully enclosing an area between the display screen and the base unit.

\* \* \* \* \*

UNITED STATES PATENT AND TRADEMARK OFFICE
CERTIFICATE OF CORRECTION

PATENT NO. : 5,986,634
DATED : November 16, 1999
INVENTOR(S) : Paul A. Alioshin et al.

Page 1 of 1

It is certified that error appears in the above-identified patent and that said Letters Patent is hereby corrected as shown below:

Claim 5, Column 8,
Line 57, delete "lipped" and replace it with -- flipped --.

Claim 19, Column 9,
Line 67, delete "Lip-right" and replace it with -- up-right --.

Claim 25, Column 10,
Line 46, delete "secures" and replace it with -- secured --.

Signed and Sealed this

Third Day of July, 2001

Attest:

*Nicholas P. Godici*

NICHOLAS P. GODICI
*Attesting Officer* — *Acting Director of the United States Patent and Trademark Office*